(12) United States Patent
Chang

(10) Patent No.: US 8,235,611 B2
(45) Date of Patent: Aug. 7, 2012

(54) KEY STRUCTURE OF A KEYBOARD

(75) Inventor: Cheng-Chung Chang, Sinjhuang (TW)

(73) Assignee: Mae Tay Plastic Co., Ltd., Taipei (TW)

( * ) Notice: Subject to any disclaimer, the term of this patent is extended or adjusted under 35 U.S.C. 154(b) by 420 days.

(21) Appl. No.: 12/430,009

(22) Filed: Apr. 24, 2009

(65) Prior Publication Data

US 2010/0272490 A1 Oct. 28, 2010

(51) Int. Cl.
*B41J 5/00* (2006.01)
*B41J 29/12* (2006.01)
*H01H 13/00* (2006.01)
*H01H 13/70* (2006.01)

(52) U.S. Cl. ..... 400/490; 400/472; 400/495; 400/495.1; 400/496; 200/341; 200/344; 200/345

(58) Field of Classification Search .......... 400/472–496; 200/344–345, 341
See application file for complete search history.

(56) References Cited

U.S. PATENT DOCUMENTS 5,669,723 A * 9/1997 Chang ........................... 400/496
6,776,547 B1 * 8/2004 Dubois et al. ................. 400/496
* cited by examiner

*Primary Examiner* — Michael G Lee
*Assistant Examiner* — Laura Gudorf
(74) *Attorney, Agent, or Firm* — Chun-Ming Shih

(57) ABSTRACT

A key structure of a keyboard, comprising: a backplane and a plurality of key caps. The backplane is concaved a plurality of grooves. A frame is deposed on the groove, and outside of the frame two fixed bases and two positioning columns are correspondingly deposed on the opposite sides. A clamp is deposed on the fixed base. A link bar, consists of a cross bar and two struts. The cross bar and the struts are mutually perpendicular and shown as an upside-down U shape. A key cap, in which a convex column is extended from the inside of the key cap, and two clips are protruded respectively on the opposite sides of the convex column, as well as a slot is deposed on the clip. The clips are adapted to position the cross bar of the link bar to a clamp of a fixed base on the backplane. And two struts are adapted to be held by the positioning column, so that the two struts only can be moved up and down and will not mismatch. Moreover, combining the key cap with the backplane to make the convex column plugging into the frame, therefore the two slots of the clip are adapted to be combined with the two struts. No matter what position of the key cap surface is pressed, the key cap will be affected by the link bar; such will make the key being pressed down completely.

4 Claims, 5 Drawing Sheets

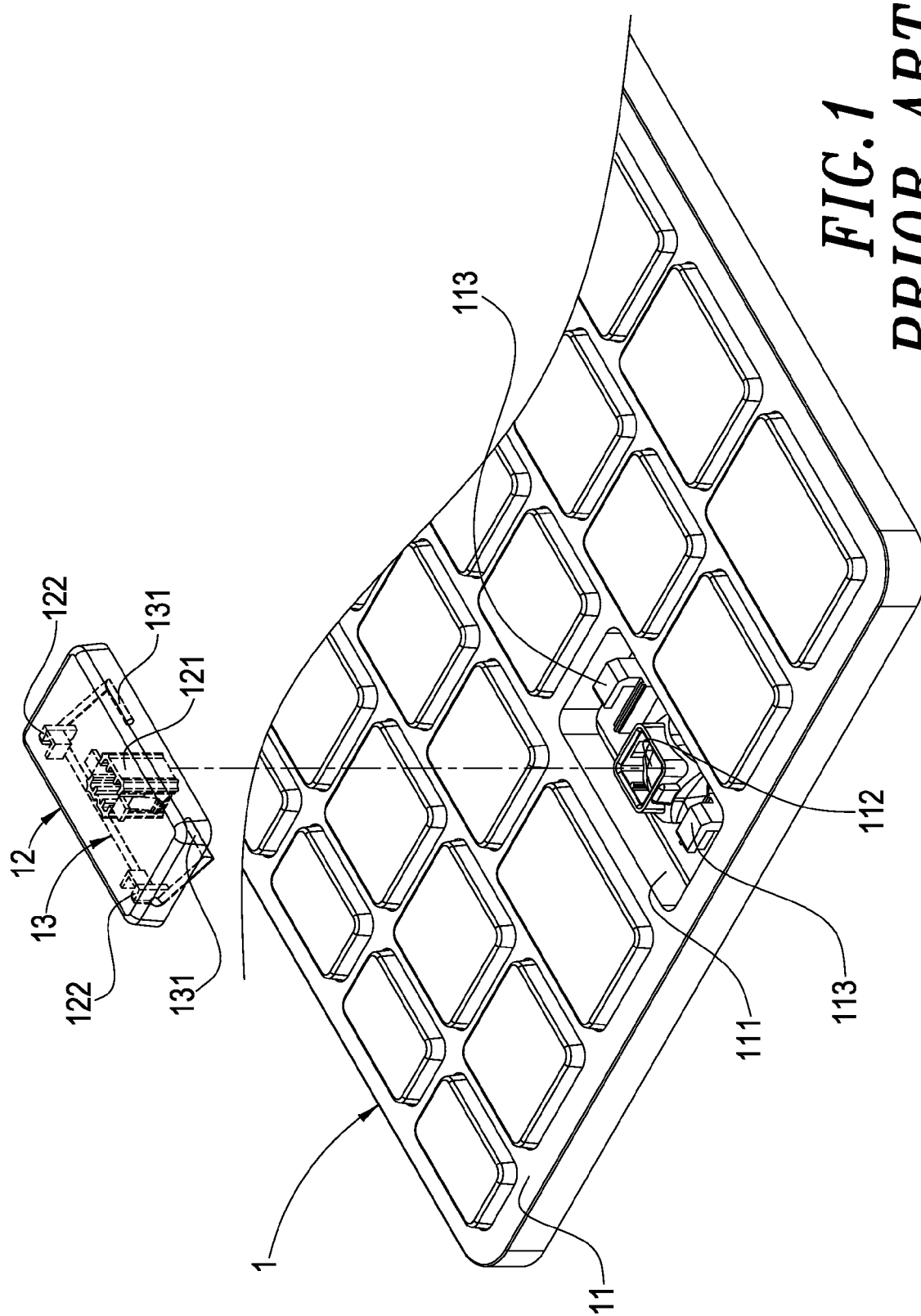

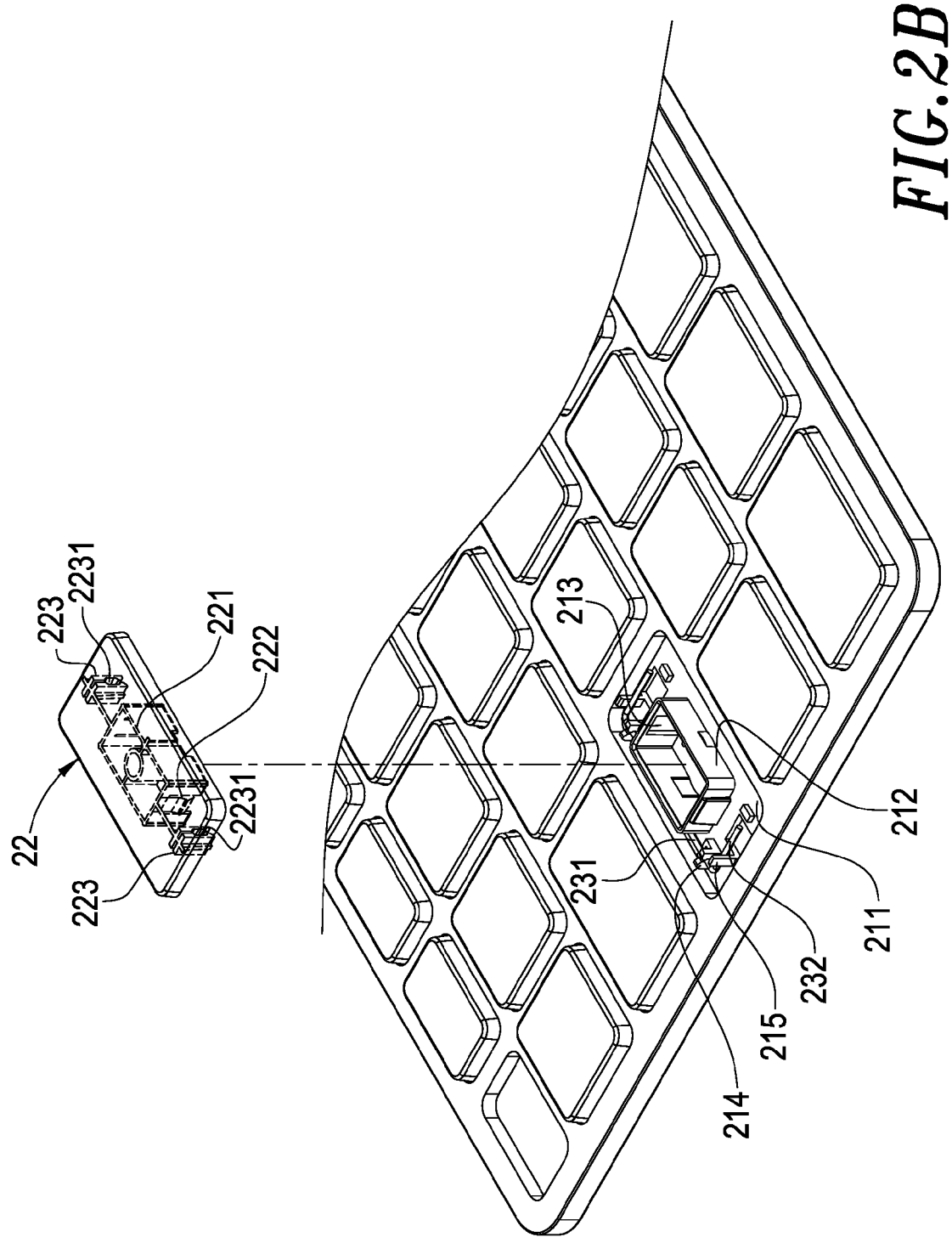

KEY STRUCTURE OF A KEYBOARD

BACKGROUND OF THE PRESENT INVENTION

1. Field of Invention

The present invention relates to a key structure of a keyboard. More particularly, the present invention relates to a kind of the key structure of the keyboard in which a link bar and a key cap can be assembled rapidly on the backplane. The key structure of the keyboard is configured to achieve the purpose of the rapid assembly.

2. Description of Related Arts

Please refer to the FIG. 1 in which is an exploded view of a conventional keyboard, comprising a keyboard body 1. The keyboard body 1 is composed of a base 11 and a plurality of key caps 12. A plurality of grooves 111 of long keys is disposed on the base 11, in which the groove 111 is disposed a convex hollow column 112 and two hook bases 113. The two hook bases 113 are respectively disposed on the opposite sides of the convex hollow column 112. A key cap 12, in which a frame 121 is extended from the key cap 12. A clasp 122 is respectively disposed on the each side of the frame 122. A link bar 13 with C shape is pivoted on the two clasps 122.

The key cap 12 is set between the two hook bases 113 of the groove 111 through the two ends 131 of the link bar 13, as well as the frame 121 of the key cap 12 is adapted to be inset correspondingly in the convex hollow column 112 of the base 11. Consequently, the key cap 12 is disposed in the groove 111 of the base 11.

Nevertheless, when the key cap 12 of the keyboard body 1 is impaired and a consumer wants to replace the component by himself, the consumer needs to set the two ends 131 of the link bar 13 into the two hook bases 113 of the groove 111, as well as the consumer needs to set the frame 121 of the key cap 12 precisely corresponding to the convex hollow column 112. If one of the two ends 131 of the link bar 13 comes off the hook base 113 while insetting correspondingly, the key cap 12 is not adapted to be combined with the groove 111 of the base 11, and the consumer needs to inset correspondingly again. Therefore, it takes time and causes trouble for the consumer to replace the components.

SUMMARY OF THE PRESENT INVENTION

One objective of the present invention is to provide a key structure of a keyboard in which a link bar and a key cap are adapted to be deposed quickly on a backplane, such will cut down the assembly working-hour and reach the purpose of cost saving.

The second objective of the present invention is to provide the key structure of the keyboard with many advantages, such as rapid assembly, convenient operation and cost-saving.

The components to accomplish this utility model invention of the key structure of the keyboard mentioned above, comprising: a backplane, a plurality of key caps and a link bar. The backplane is concaved a plurality of grooves. A frame is disposed on the groove, and outside of the frame two fixed bases and two positioning columns are correspondingly disposed on the opposite sides. A clamp is disposed on the fixed base. A link bar, consists of a cross bar and two struts. The cross bar and the struts are mutually perpendicular and shown as an upside-down U shape. A key cap, in which a convex column is extended from the inside of the key cap, and two clips are protruded respectively on the opposite sides of the convex column, as well as a slot is disposed on the clip. The clips are adapted to bond the link bar to the backplane, so that the cross bar is inset into the clamp of the fixed base. The strut is held by the positioning column to position the link bar, and the two struts only can be moved up and down. Moreover, combining the key cap with the backplane to make the convex column plugging into the frame, therefore the slot of the clip is adapted to be combined with the strut. No matter what position of the key cap surface is pressed, the key cap will be affected by the link bar; such will make the key being pressed down completely and reaching the definition of pressing a key.

These features and advantages of the present invention will be fully understood and appreciated from the following detailed description of the accompanying Drawings.

These and other objectives, features, and advantages of the present invention will become apparent from the following detailed description, the accompanying drawings, and the appended claims.

BRIEF DESCRIPTION OF THE DRAWINGS

FIG. 1 is a decomposition view of the key structure of the conventional keyboard;

DETAILED DESCRIPTION OF THE PREFERRED EMBODIMENT

Figure 2A:
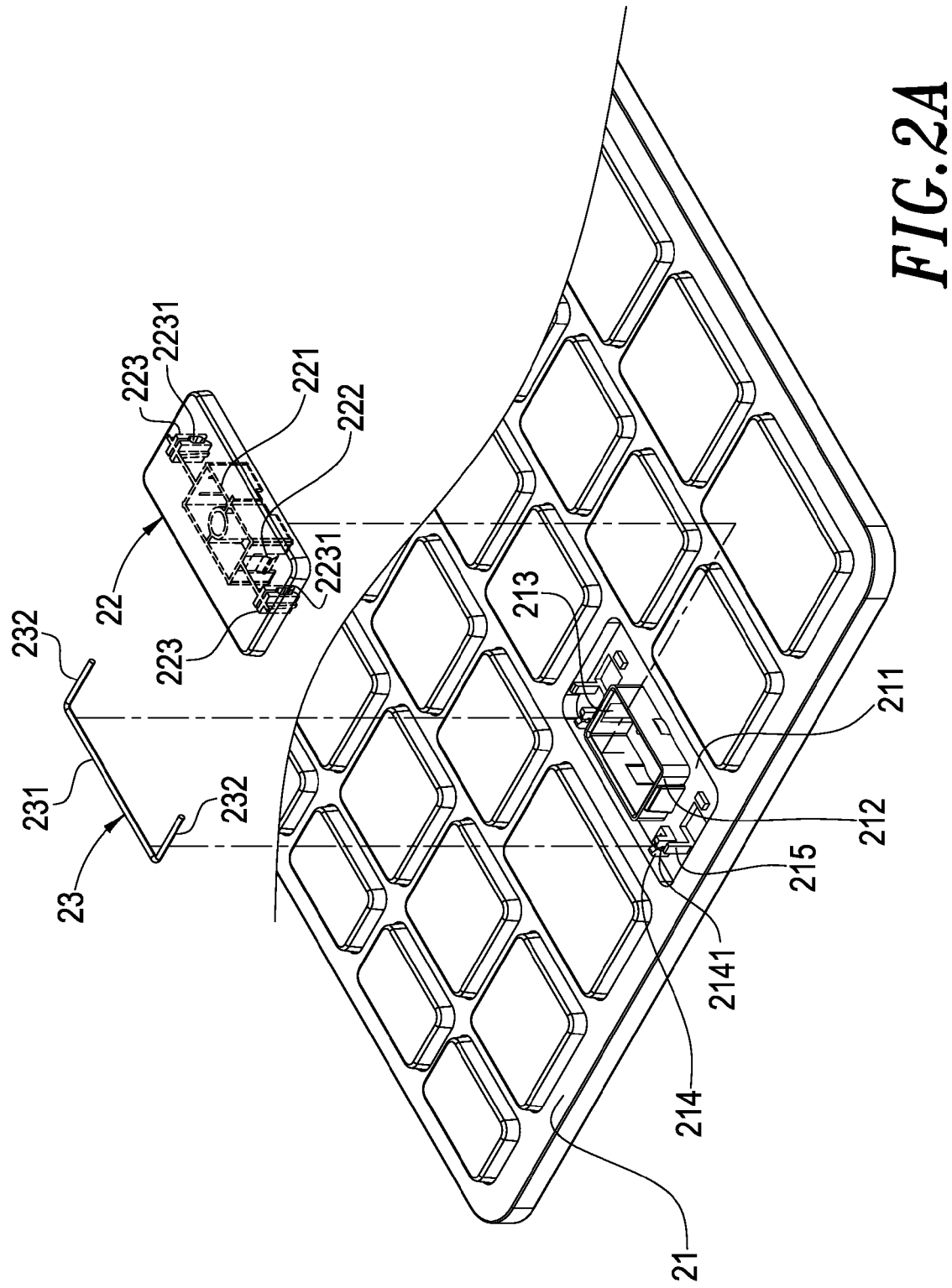
FIG. 2A, B, C are the decomposition views of the key structure of the present invention keyboard.

Please refer to the FIG. 2 in which is a key structure of the keyboard provided by the present invention, mainly comprising devices as follows.

The key structure comprises a backplane 21 concaved a groove 211, in which the groove 211 is disposed on a frame 212 whereon. Two troughs 213 are oppositely concaved respectively on the inside of the frame 212, and two fixed bases 214 and two positioning columns 215 are oppositely disposed respectively on the outside of the frame 212. A clamp 2141 is disposed on the fixed base 214.

The key structure comprises a link bar 23, consists of a cross bar 231 and two struts 232. The two struts 232 are vertically extended from the two ends of the cross bar 231 and such is shown as an upside-down U shape.

The key structure comprises a key cap 22, in which a convex column 221 is extended from the inside of the key cap 22. Two buckles 222 are respectively disposed on the opposite sides of the convex column 221. Two clips 223 are also protruded respectively on the opposite sides of the convex column 221, as well as a slot 2231 is disposed on the clip 223.

The cross bar 231 of the link bar 23 is inset into the clamp 2141 of the fixed base 214 on the base 21. The strut 232 is held by the positioning column 215 to position the link bar 232, and the cross bar 231 is configured to be a pivot of the strut 232, so that the struts 232 can be moved up and down. Moreover, combining the key cap 22 with the backplane 21 to make the convex column 221 of the key cap 22 plugging into the frame 212 on the base 21, therefore, the slot 2231 of the clip 223 of the key cap 22 is adapted to be clasped with the two struts 232 of the link bar 23, and a spacing is kept between the two struts 232 of the link bar 23 and the backplane 21.

Figure 2C:
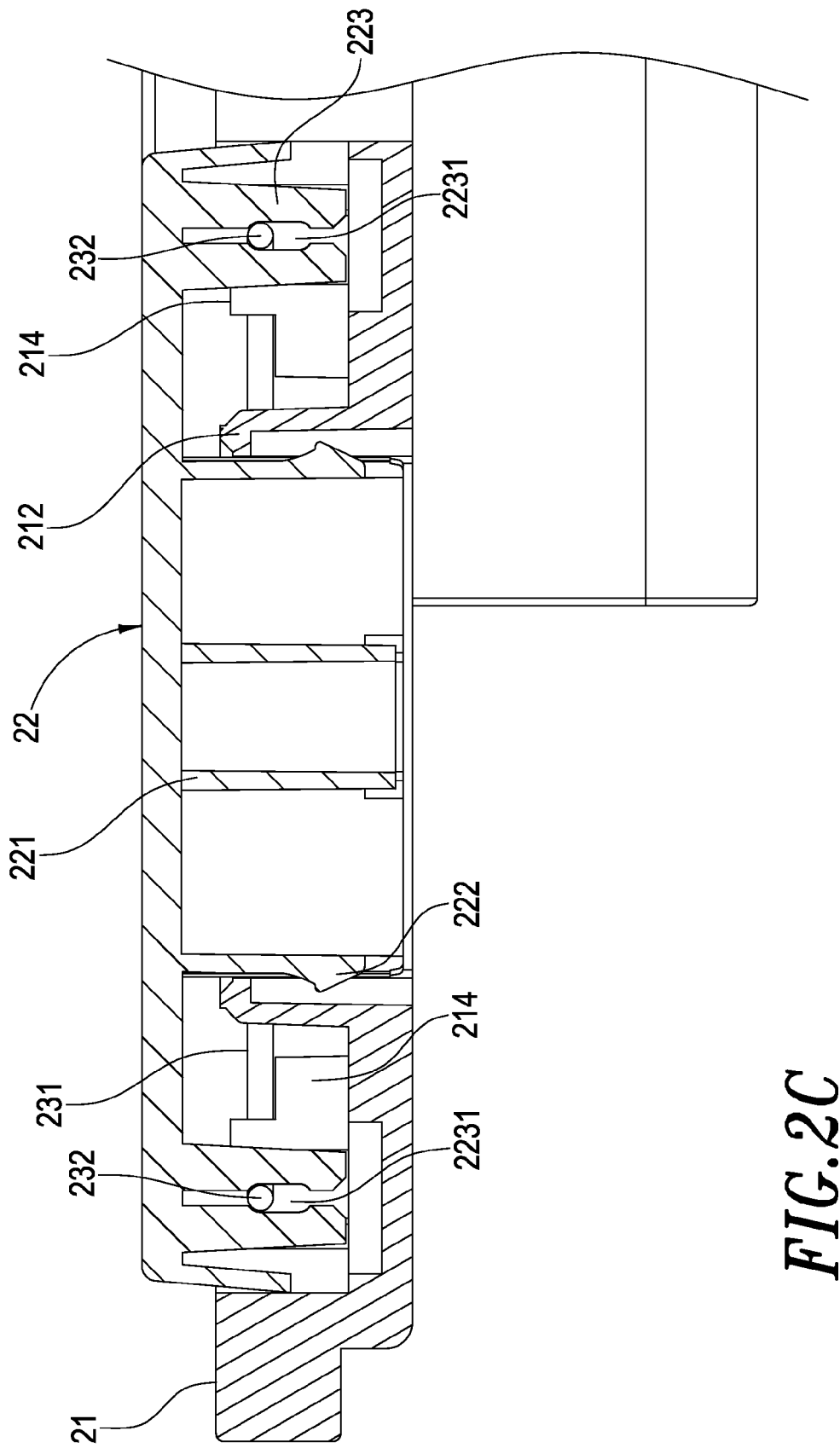
Figure 3:
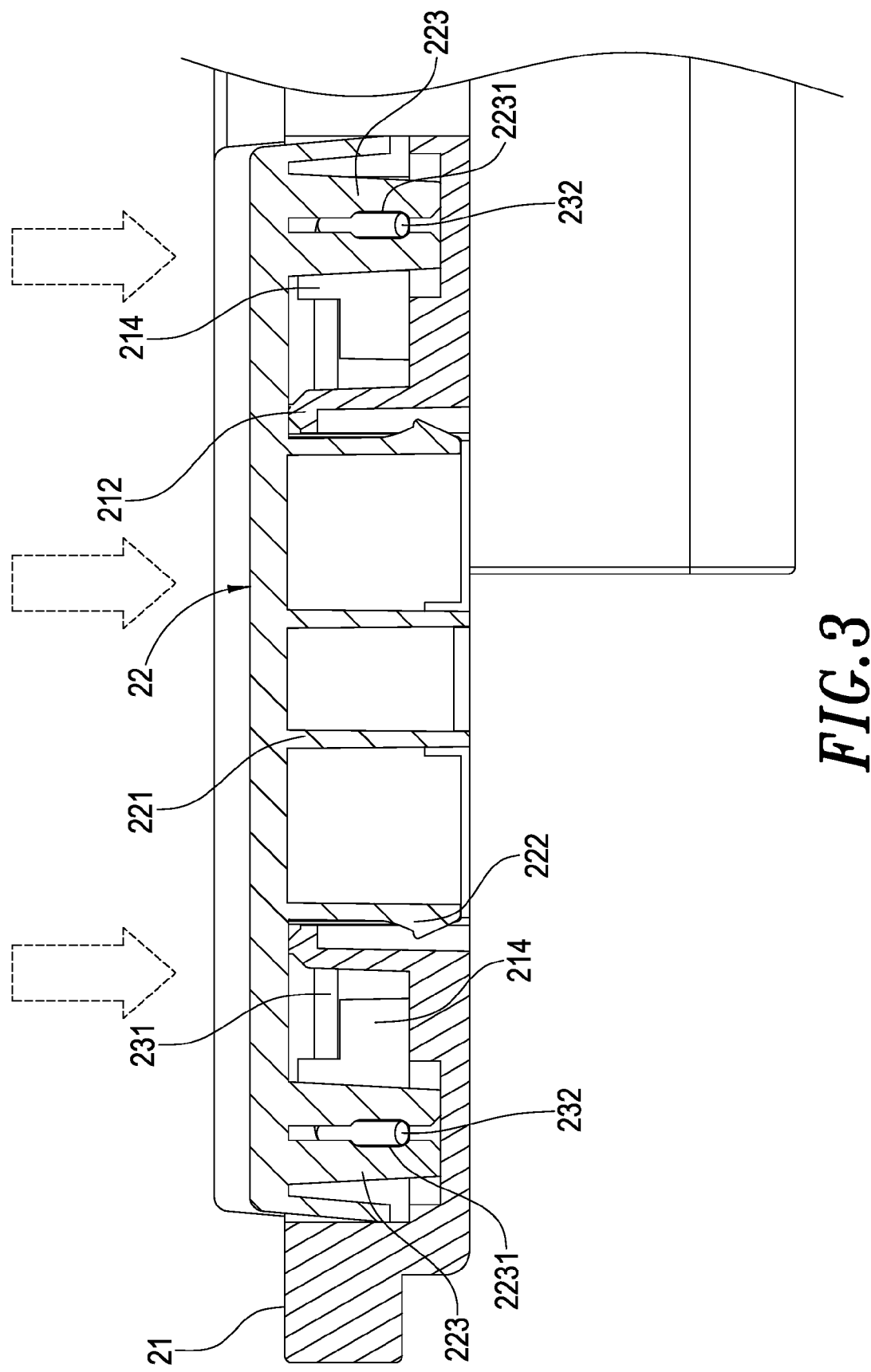
FIG. 3 is a schematic view of the embodiment of the key structure of the present invention keyboard.

Please refer to the FIG. 2C and FIG. 3, in which the schematic views of the embodiment of the key structure of the present invention keyboard are shown. When a user presses any part of surfaces of the key cap 22, the two struts 232 of the link bar 23 is adapted to be clasped with the slot 2231 of the clip 223 of the key cap 22. Therefore, the key cap 22 is correspondingly affected by the link bar 23, and the key cap 22 is adapted to make the convex column 221 being adapted to be inset completely into the frame 212 of the backplane 21 with a level state. The situation that the key cap 22 is uneven will not happen, and the purpose of precisely pressing can be achieved.

The key structure of the keyboard mentioned by the present invention is superior to the conventional type key structure of keyboard in the following aspects:

1. The present invention is configured to make the link bar and the key cap being assembled quickly on the backplane, such will cut down the assembly working-hour and reach the purpose of cost saving.

2. The present invention possesses many advantages, such as rapid assembly, convenient operation and cost-saving.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

One skilled in the art will understand that the embodiment of the present invention as shown in the drawings and described above is exemplary only and not intended to be limiting. It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A key structure of a keyboard, comprising:
   a backplane being concaved a groove, a frame being disposed on the groove, two troughs being concaved respectively on two opposite inner sidewalls of the frame, two fixed bases and two positioning columns being oppositely disposed respectively on the outside of the frame, and two dents being formed adjacent to the positioning columns, respectively;
   a link bar, comprising a cross bar and two struts which extend vertically from the two ends of the cross bar;
   a key cap, in which a convex column is disposed inside, two buckles being disposed respectively on two opposite sides of the convex column, and two clips are disposed respectively on the opposite sides of the convex column to correspond to the two dents;
   wherein the clips are adapted to bond the link bar to the fixed bases of the backplane, hold two struts by guiding of the positioning columns, and combine the key cap with the backplane; the convex column plugging into the frame so that the buckles are engaged with the troughs, respectively, to combine the clips with the struts, and a spacing being kept between the strut and the backplane.

2. The key structure of a keyboard as claimed in claim 1, wherein a clamp being disposed on the fixed base, and the clamp being configured to fix and to join the cross bar of the link bar.

3. The key structure of a keyboard as claimed in claim 1, wherein the link bar is shown as an upside-down U shape.

4. The key structure of a keyboard as claimed in claim 1, wherein a slot is formed on a surface facing the dent of the clip so that the strut passes through the clip within the slot.

* * * * *